(12) United States Patent
Iannello

(10) Patent No.: US 7,628,003 B2
(45) Date of Patent: Dec. 8, 2009

(54) MOWER DECK CLEANING AND LUBRICATING DEVICE

(76) Inventor: Joseph P. Iannello, 1080 Cohocton Rd., Corfu, NY (US) 14036

( * ) Notice: Subject to any disclaimer, the term of this patent is extended or adjusted under 35 U.S.C. 154(b) by 0 days.

(21) Appl. No.: 11/771,342

(22) Filed: Jun. 29, 2007

(65) Prior Publication Data

US 2008/0010962 A1 Jan. 17, 2008

Related U.S. Application Data

(63) Continuation-in-part of application No. 10/910,393, filed on Aug. 3, 2004.

(51) Int. Cl.
*A01D 19/00* (2006.01)
(52) U.S. Cl. .................................................. 56/16.8
(58) Field of Classification Search .............. 56/16.8; 401/25, 289, 138; 15/111, 146, 246; 134/8
See application file for complete search history.

(56) References Cited

U.S. PATENT DOCUMENTS

| | | | |
|---|---|---|---|
| 1,402,485 A | 1/1922 | Fredriksen et al. | |
| 1,752,823 A * | 4/1930 | Walker | 239/590.3 |
| 2,666,221 A | 1/1954 | Stepper et al. | |
| 2,723,056 A * | 11/1955 | Smith | 222/396 |
| 2,863,162 A | 12/1958 | Draughon | |
| 2,936,563 A * | 5/1960 | Blume | 56/12.1 |
| 2,939,636 A | 6/1960 | Mullin | |
| 3,040,990 A | 6/1962 | Gotti | |
| 3,051,972 A | 9/1962 | Lacy | |
| 3,367,093 A | 2/1968 | Zwickel | |
| 3,490,212 A | 1/1970 | Hengesbach | |
| 3,535,862 A | 10/1970 | Wittwer | |
| 3,753,341 A | 8/1973 | Berg, Jr. et al. | |
| 3,760,479 A * | 9/1973 | Simmons | 29/890.11 |
| 3,765,066 A | 10/1973 | Nitz | |
| 3,856,028 A | 12/1974 | Kehler | |
| 3,857,226 A | 12/1974 | Sifakas | |
| 3,861,194 A * | 1/1975 | Simmons | 72/461 |
| 3,905,181 A | 9/1975 | Messner | |
| 3,940,827 A | 3/1976 | Greco | |
| 3,959,955 A | 6/1976 | Smith et al. | |
| 4,058,959 A | 11/1977 | Moss et al. | |
| 4,364,221 A | 12/1982 | Wixom | |
| 4,575,894 A | 3/1986 | Stevens et al. | |
| 4,762,278 A | 8/1988 | Taylor | |
| 4,962,630 A | 10/1990 | Jones | |
| 5,027,590 A * | 7/1991 | Stark | 56/12.1 |
| 5,042,242 A | 8/1991 | Evans | |
| 5,101,615 A | 4/1992 | Fassauer | |
| 5,152,549 A | 10/1992 | Aird | |
| D341,451 S | 11/1993 | Wheeler | |

(Continued)

FOREIGN PATENT DOCUMENTS

DE 19925605 12/2000

*Primary Examiner*—Árpád Fábián-Kovács
(74) *Attorney, Agent, or Firm*—Michael J. Nickerson; Basch & Nickerson LLP

(57) ABSTRACT

A device for applying a fluid to the underside of a mowing deck includes a hollow body, a plurality of outlet apertures, and a magnetic mounting assembly. The device may include at least one brush attached to a cutting blade. The device may also include a detachable and flexible fan assembly that cleans cutting debris from the topside of a mowing deck while cooling the cutting engine.

20 Claims, 17 Drawing Sheets

U.S. PATENT DOCUMENTS

| | | |
|---|---|---|
| 5,312,047 A | 5/1994 | Akers |
| 5,313,687 A | 5/1994 | Schneider |
| D350,357 S | 9/1994 | Maine |
| 5,410,776 A | 5/1995 | Schneider |
| 5,444,967 A * | 8/1995 | Meuth .................. 56/12.1 |
| 5,479,763 A | 1/1996 | Coble |
| 5,499,492 A | 3/1996 | Jameson |
| 5,515,608 A | 5/1996 | Zhang |
| 5,651,242 A | 7/1997 | Kittridge |
| 5,661,962 A | 9/1997 | Monaco |
| 5,673,856 A | 10/1997 | Krohn |
| 6,145,288 A * | 11/2000 | Tamian et al. ............. 56/16.8 |
| 6,260,340 B1 * | 7/2001 | Sanner .................. 56/16.8 |
| 6,353,960 B1 | 3/2002 | Jannicelli |
| 6,364,960 B1 * | 4/2002 | Bayley .................. 134/34 |
| D467,690 S | 12/2002 | Kee |
| 6,497,088 B1 * | 12/2002 | Holley .................. 56/16.8 |
| 6,581,363 B1 | 6/2003 | Hall |
| 6,808,126 B1 * | 10/2004 | Dunlap .................. 239/172 |
| 6,840,030 B1 | 1/2005 | Monaco |
| 6,910,320 B1 * | 6/2005 | Thorman et al. ............. 56/16.8 |
| 6,912,834 B2 * | 7/2005 | Kasanic et al. ............. 56/16.8 |
| 6,978,590 B1 | 12/2005 | Graham |
| 2002/0100265 A1 | 8/2002 | Mil'shtein et al. |
| 2002/0170281 A1 * | 11/2002 | Brown .................. 56/12.1 |
| 2003/0000195 A1 * | 1/2003 | Watkins .................. 56/320.1 |
| 2003/0101702 A1 * | 6/2003 | Hall .................. 56/16.8 |
| 2004/0098960 A1 | 5/2004 | Csonka |
| 2005/0247039 A1 * | 11/2005 | Mahan et al. ............. 56/249 |
| 2005/0274822 A1 * | 12/2005 | Lyons .................. 239/310 |
| 2007/0137161 A1 * | 6/2007 | Mahan et al. ............. 56/249 |

* cited by examiner

MOWER DECK CLEANING AND LUBRICATING DEVICE

PRIORITY INFORMATION

This application is a continuation-in-part of co-pending U.S. patent application Ser. No. 10/910,393, filed on Aug. 3, 2004. The entire content of co-pending U.S. patent application Ser. No. 10/910,393, filed on Aug. 3, 2004, is hereby incorporated by reference.

FIELD OF THE PRESENT INVENTION

The present invention is directed to a mechanical cleaning device for mounting on a cutting blade of a lawn mowing machine wherein the mechanical cleaning device includes a replaceable brush head. Moreover, the present invention is directed to a device for applying fluid to an underside of a mowing deck to clean debris therefrom.

BACKGROUND OF THE PRESENT INVENTION

A mowing device such as a lawnmower, riding lawn mower, or lawn tractor has the tendency to accumulate cut grass debris on both the underside and the topside of the mowing deck. The accumulation of such debris can impede the proper performance of the mowing device, and can also create maintenance problems such as the increased probability of oxidation of the mowing deck.

Often times the operator of a single bladed mowing device will clean the underside of the mowing deck using a scraper or stiff brush. This involves tipping the mower to access the underside of the mowing deck, and possibly removal of the cutting blade. This cleaning procedure is prone to problems. For example, if the mower is tipped, the procedure may involve fuel and oil leaking from the mower, creating both a safety and an environmental hazard.

For larger mowing decks that cannot be readily tipped, the cleaning procedure involves the physical removal of the mowing deck; a procedure that is time consuming and requires a great deal of physical effort. Once the underside of the mowing deck is exposed, the removal of accumulated cutting debris is accomplished by scraping or brushing the underside of the mowing deck. This also exposes the operator to the risk of personal injury from the cutting blade or blades.

Various conventional devices have been utilized to clean a mowing deck while the deck remains in an upright and operable position. These conventional devices commonly use only water as the cleaning agent. Moreover, many of these conventional devices are attached to the ground, and the mower is placed over the device. These conventional devices require various size cleaning fixtures to accommodate the multitude of mowing deck sizes and shapes on the market today. In addition, should the device come into contact with the spinning blades, the device will be fragmented into pieces, which may cause damage to the blade or deck and/or be propelled directly at an individual.

One conventional device that uses water as the cleaning agent is attached to the mowing deck by drilling a hole through the top of the mowing deck and attaching a water nozzle to the hole. This approach is time consuming to install, can weaken the structural strength of the mowing deck, and also represents a potential safety hazard should the nozzle vibrate loose and drop into the rotating blades. Also, many mowing decks contain integral belts and pulleys on the top surface of the mowing deck, and the placement of a nozzle amongst this assemblage of pulleys and belts creates a potential safety risk.

Therefore, it is desirable to provide a cleaning mechanism that; can be used with any size or shape mowing deck; does not require attachment to the ground; cannot be drawn into the cutting blades; does not require cutting, drilling or modification to the mowing deck; and can be used with an optional mechanical brush attachment to aggressively remove accumulated grass debris. In addition, it is desirable to provide a cleaning mechanism that can be used with an optional fan attachment to reduce the accumulation of debris on the top side of the mowing deck. Also, it is desirable to provide a cleaning mechanism that may be used to lubricate and rust-proof a mowing deck.

SUMMARY OF THE PRESENT INVENTION

One embodiment of the present invention involves a cleaning device for injecting a fluid to an underside of a mowing deck. The cleaning device includes a hollow member including an inlet for receiving fluid from a source and an outlet; a plenum chamber appended to the outlet of the hollow member; a plurality of apertures situated in the plenum for directing jets of the fluid to the underside of the mowing deck; and a magnetic mounting assembly to secure the hollow member to a side wall of the mowing deck.

Another embodiment of the invention includes a cleaning device for injecting a fluid to an underside of a mowing deck. The cleaning device includes a hollow member including an inlet for receiving fluid from a source and an outlet; an aperture located in proximity of the outlet of the hollow member for directing a jet of the fluid to the underside of the mowing deck; and a magnetic mounting assembly to secure the hollow member to the mowing deck.

Another embodiment of the invention includes a cleaning device for injecting a fluid to an underside of a mowing deck. The cleaning device includes a hollow member including an inlet for receiving fluid from a source and an outlet; a plenum chamber appended to the outlet of the hollow member, the plenum extending away from a sidewall of a mowing deck and in parallel to a blade assembly located in the mowing deck; a plurality of apertures situated in the plenum for directing jets of the fluid to the underside of the mowing deck; and a mounting assembly to secure the hollow member to the mowing deck.

BRIEF DESCRIPTION OF THE DRAWINGS

The present invention may take form in various components and arrangements of components, and in various steps and arrangements of steps. The drawings are only for purposes of illustrating a preferred embodiment and are not to be construed as limiting the present invention, wherein.

DETAILED DESCRIPTION OF THE PRESENT INVENTION

Figure 1:
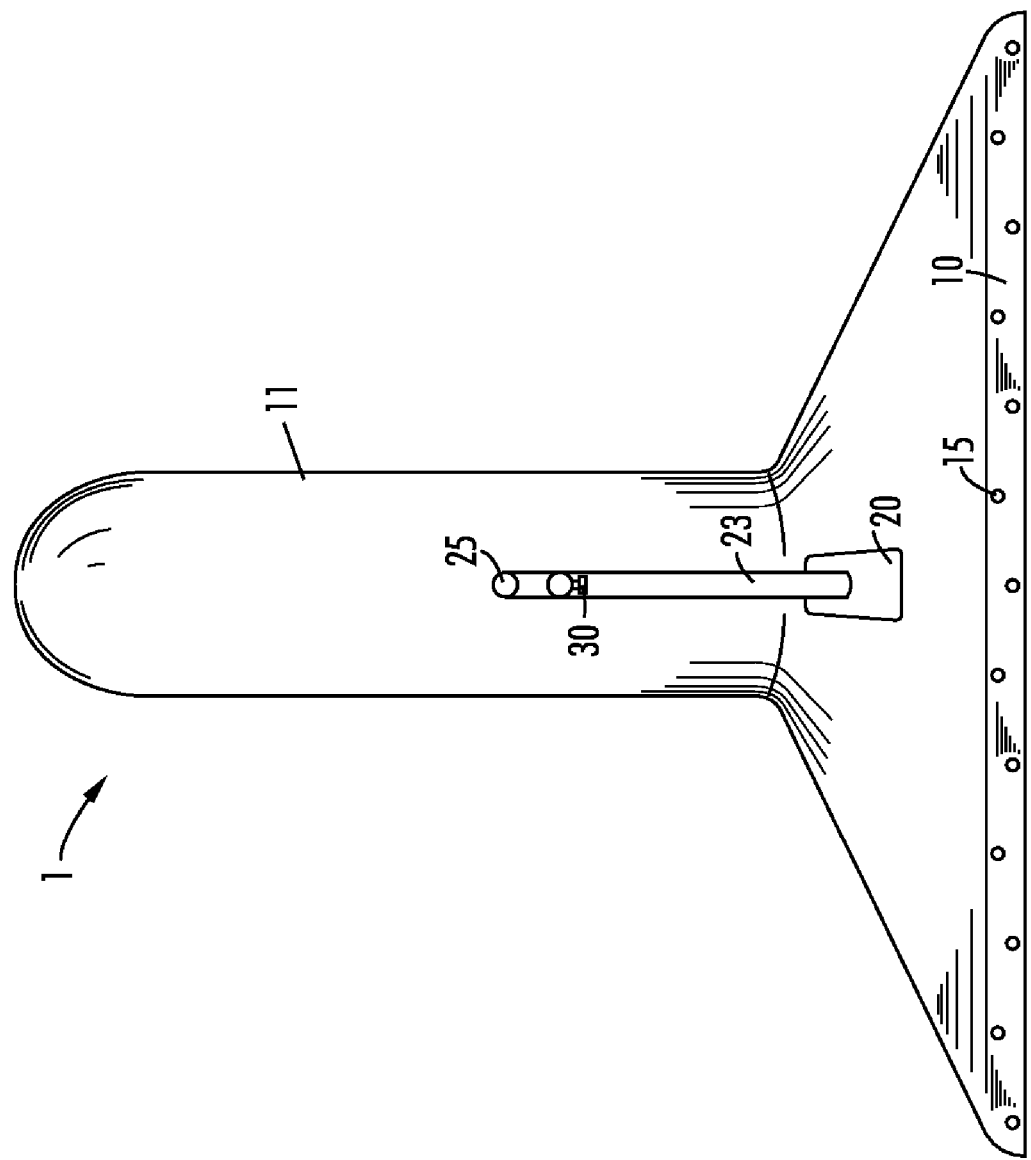
FIG. 1 is a top plan view of the first cleaning element of the present invention.

The present invention will be described in connection with preferred embodiments; however, it will be understood that there is no intent to limit the present invention to the embodiments described herein. On the contrary, the intent is to cover all alternatives, modifications, and equivalents as may be included within the spirit and scope of the present invention, as defined by the appended claims.

For a general understanding of the present invention, reference is made to the drawings. In the drawings, like reference have been used throughout to designate identical or equivalent elements. It is also noted that the various drawings illustrating the present invention may not have been drawn to scale and that certain regions may have been purposely drawn disproportionately so that the features and concepts of the present invention could be properly illustrated.

An apparatus 1 is illustrated in FIG. 1 for cleaning and lubricating the underside of a mowing deck of a garden tractor, riding lawn mower, lawn mower or other agricultural cutting equipment. The body 11 of the apparatus 1 is generally hollow to allow the flow of fluid from a source, such as a garden hose, through the body 11 and out a series of apertures 15. Optionally a cleaning fluid or lubricating oil may be dispensed from a source of cleaning fluid or lubricating oil such as a dispenser or container with a hose connection. The series of apertures 15 allow for the delivery of fluid when the hollow body 11 is connected to a source of fluid such as water or oil.

The series of apertures 15 are narrow to allow for pressurized delivery of the fluid. The quantity of apertures may vary depending on the size of the mowing deck. The angle at which the apertures 15 deliver pressurized fluid can be controlled by both the shape of the aperture as well as the perspective of the surface that contains the apertures. The angle of fluid delivery will typically be between 30 degrees and 90 degrees with respect to the topside of the blade. Each aperture may be round, oblique, oval, multi-sided, or built up in a nozzle configuration.

Body 11 is attached to the underside of a mowing deck using a clamp assembly 20 that is mechanically fastened to the body 11 using techniques commonly known to one skilled in the art. These techniques may include rivets, screws, bolts, glue, and the like. The clamp assembly 20 is made from a metal such as aluminum, steel, brass, and the like. The clamp assembly 20 allows the cleaning and lubricating apparatus 1 to be attached to the underside of the mowing deck by inserting the downward metal flange of a typical mowing deck between the two forked elements 25 of the clamp assembly 20.

Once the cleaning and lubricating apparatus 1 is placed under the mowing deck in a position acceptable to the operator of the device, the thumbscrew 30 is tightened onto the flange of the mowing deck, forcibly fastening the forked elements 25 of the clamp assembly 20 to the mowing deck flange. The thumbscrew may include a nylon insert, a set screw, thread locking material, a lock washer, or other component to prevent said thumbscrew from becoming loose. Such components are known to those skilled in the art. The clamp assembly 20 may also optionally be adjustable in both the horizontal plane and the vertical plane to allow the operator of the device to optimize the placement of the device under the mowing deck.

Figure 2:
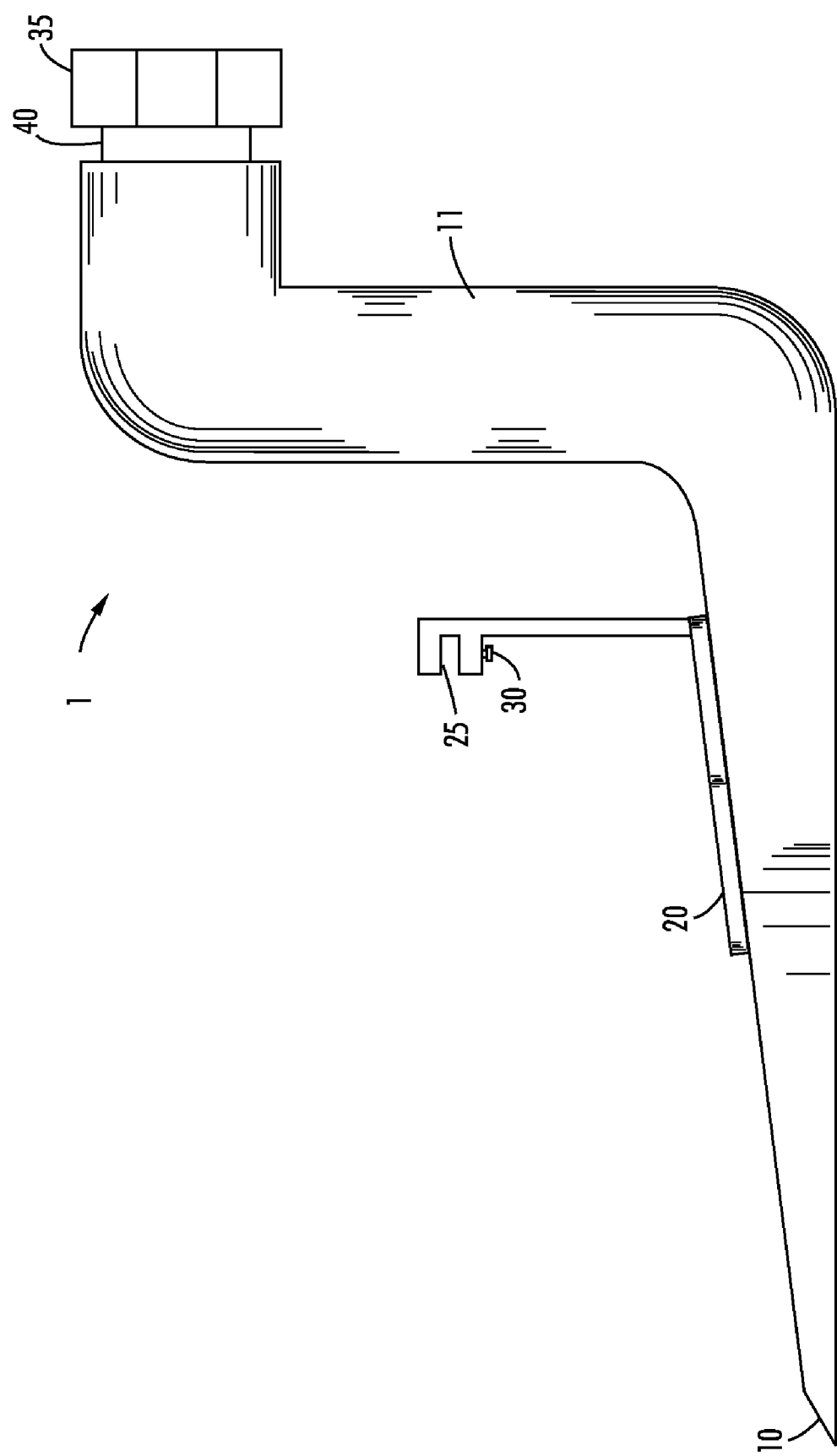
FIG. 2 is a side elevational view of the cleaning apparatus of FIG. 1.

Referring now to FIG. 2, a side elevational view of the cleaning apparatus 1 is shown. The apparatus contains a hose fitting 35 that may be a threaded garden hose style fitting, a quick release hose fitting, a water shut-off fitting, a threaded fitting, or a custom fitting. The hose fitting may be made of either metal or plastic. The hose fitting 35 is connected to the body of the apparatus 11 using a transitional connector 40 that allows for permanent attachment of the transitional connector 40 to the body of the apparatus 11.

The transitional connector 40 is made of either a plastic or a metal, and is permanently attached to the body of the apparatus 11 using an adhesive, plastic welding, or a mechanical fitting such as a barbed fitting or a threaded fitting. The transitional connector 40 allows one to change the hose fitting 35 to a different style that may be more suitable to the application; such as changing the fitting from a garden hose fitting to a quick connect fitting.

Figure 3:
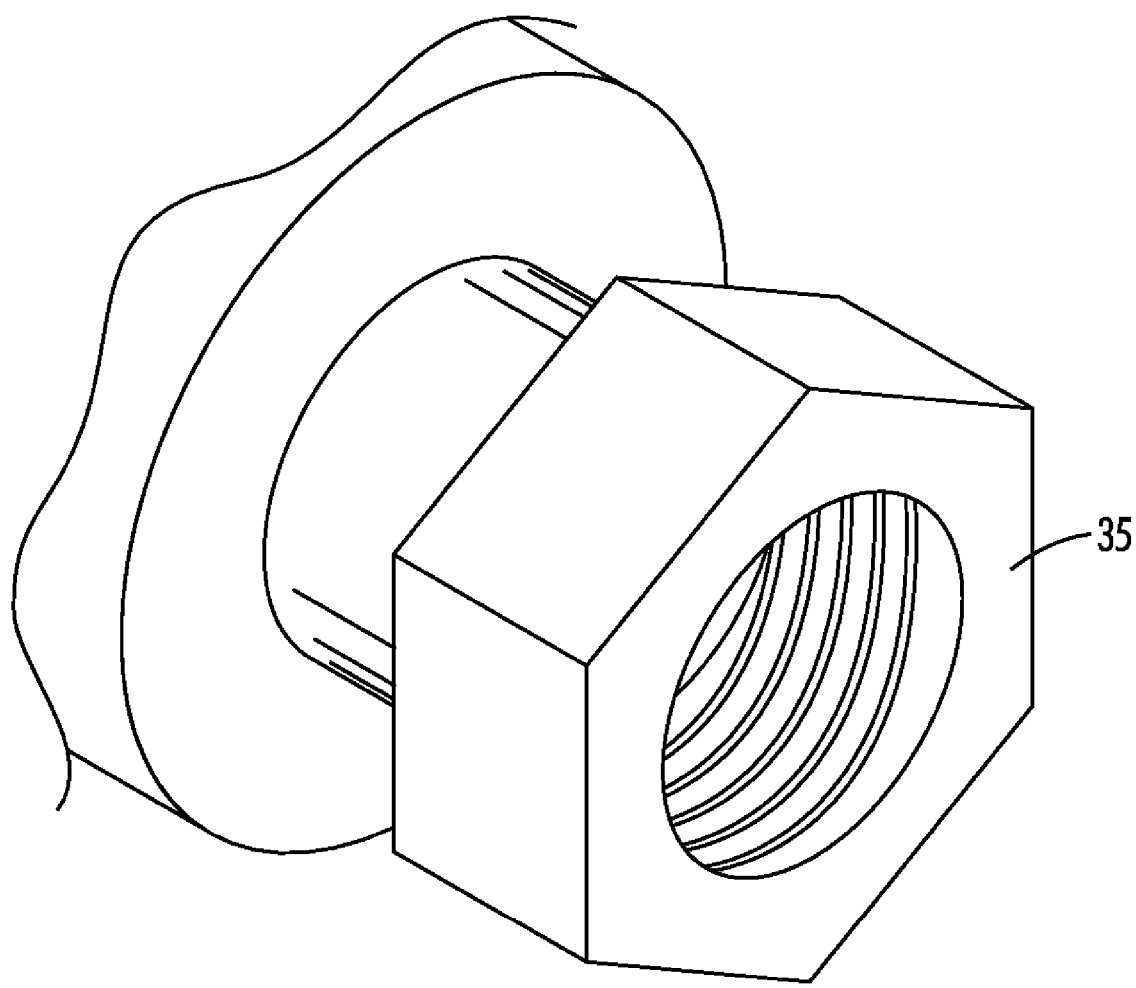
FIG. 3 is a detail view of an inlet coupling for connection with a quick release garden hose coupling.

FIG. 3 shows, in more detail, the hose fitting 35, and the termination of the hose connector to the transitional connector 40. The transitional connector 40 may also contain a narrowed or modified flow channel to restrict or change the flow of fluid traversing the transitional connector 40.

The method of manufacturing the apparatus 1 involves the simple assembly of several plastic and metal parts. The body 11 may be made of plastic. The body 11 is drilled with a plurality of fine holes 15 along the angled edge 10. The drilled holes may be round, oblique, geometric, or built up in a nozzle configuration.

The body 11 is then drilled on the top surface with several holes sufficient to allow the attachment of the clamp assembly 20 using screws, rivets, glue or other fasteners known to one skilled in the art. The clamp assembly is made of a metal, and is fabricated either by machining or casting. The transitional connector 40 is then attached to the appropriately sized opening in the body 11 using threads, barbs, glue, or welding techniques. The hose fitting 35 is finally threaded to the transitional connector 40.

Figure 4:
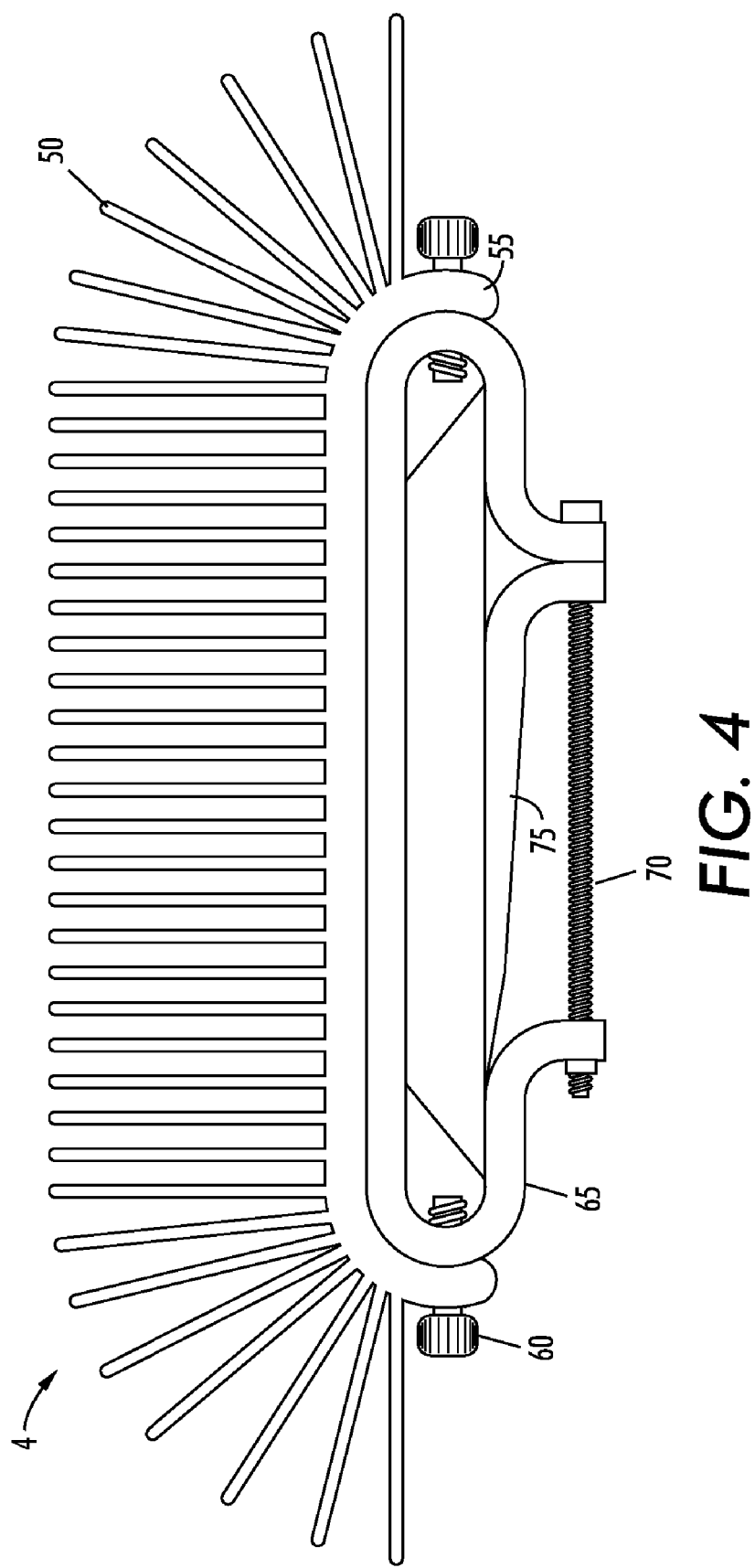
FIG. 4 is a plan view of the second cleaning element of the present invention.

FIG. 4 shows a cleaning brush 4 that is attached to a mowing blade to provide mechanical cleaning to the underside of a mowing deck. The cleaning brush 4 may be used in conjunction with the cleaning apparatus 1 to remove built up layers of cutting debris that are difficult to remove by pressurized water alone. The cleaning brush 4 contains two main assemblies, a permanent metal body 65 and a replaceable brush head 50. Both of these two main assemblies are shown separately in FIGS. 5 and 6, respectively. The replaceable brush head 50 allows one to replenish the mechanical cleaning function of the cleaning brush 4 at low cost. The replaceable brush head 50 further allows a variety of different brush heads to be used, dependent on the application.

For example, the replaceable brush head 50 may contain bristles that are made of stiff monofilament, or may contain bristles made of a metal. Different material properties such as stiffness and durability may be incorporated into a variety of brush heads from which the operator may chose.

The replaceable brush head 50 is mounted to the permanent metal body 65 using two or more bolts 60. Each bolt 60 passes through a hole in the replaceable brush head 50 and terminates in a threaded fitting on the permanent metal body 65. To replace the brush head 50, one merely unscrews the attachment bolts 60, removes the old brush head 50, and attaches a new brush head by reversing the disassembly process. The bolts 60 may also contain a lock washer, locking thread compound, a nylon insert, or other material to prevent the bolt from vibrating loose. The bolts 60 are properly torque to reduce the occurrence of such loosening.

Figure 5:
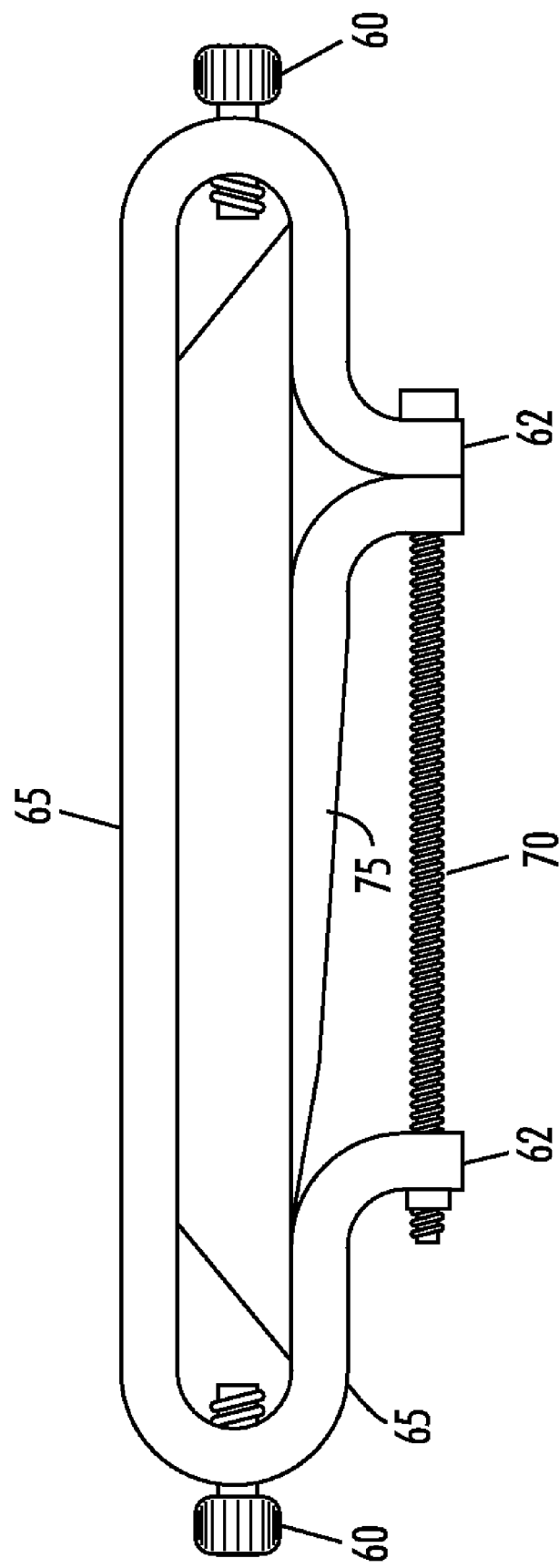
FIG. 5 is a plan view of the base structure of the second cleaning element of FIG. 4.

Referring now to FIG. 5, the permanent metal body 65 that makes up one of the two major assemblies of the cleaning brush 4 is shown. The permanent metal body 65 may be made from aluminum, steel, brass, stainless steel, titanium, or the like. The permanent metal body 65 is made as an expandable loop 75 with two flanges 62 to accommodate a threaded bolt 70. The threaded bolt 70 is preferably made of hardened steel to withstand high bolt torque.

The permanent metal body 65 is placed over the end of a mowing blade, and the bolt 70 is tightened so that the metal body 65 constricts around the mowing blade, and provides mechanical attachment of the cleaning brush 4 to the mowing blade. The threaded bolt 70 is properly tightened so that the cleaning brush 4 remains on the mowing blade while the mowing blade is rotating during the cleaning process. The permanent metal body 65 is formed from metal that has undergone the secondary operation of drilling holes to accommodate bolt 70 and drilling and threading holes to accommodate bolts 60.

Figure 6:
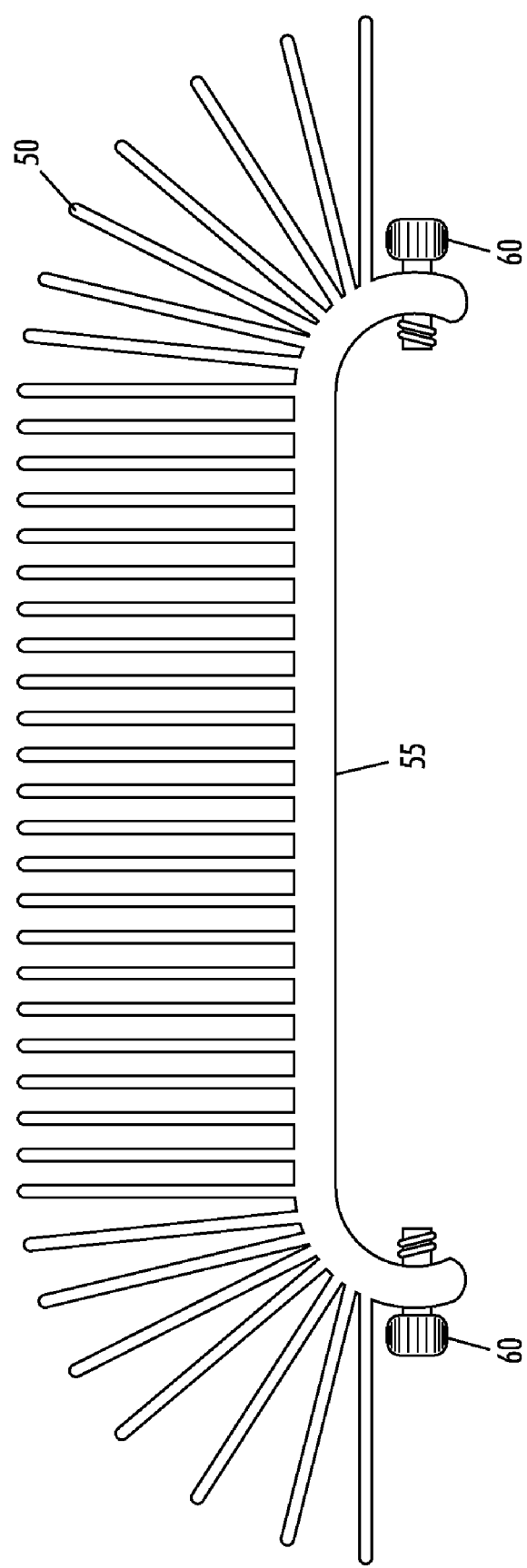
FIG. 6 is a plan view of the replaceable cleaning brush of the cleaning apparatus of FIG. 4.

FIG. 6 shows the replaceable brush head 50. The brush head is made from a metal or plastic base 55 that is shaped so as to conform to the upper surface of the permanent metal body 65. The base 55 is drilled with a plurality of holes that receive bristles 50. The bristles 50 are made of stiff monofilament similar to that used in commercial string trimmers.

The replaceable brush head may optionally be made entirely of plastic. The bristles 50 may optionally be made of a metal. The bristles may optionally be shaped such that the end of each bristle is bent at a ninety degree angle. The replaceable brush head 50 contains two or more bolts 60 that are used to attach the replaceable brush head 50 to the permanent metal body 65.

Figure 7:
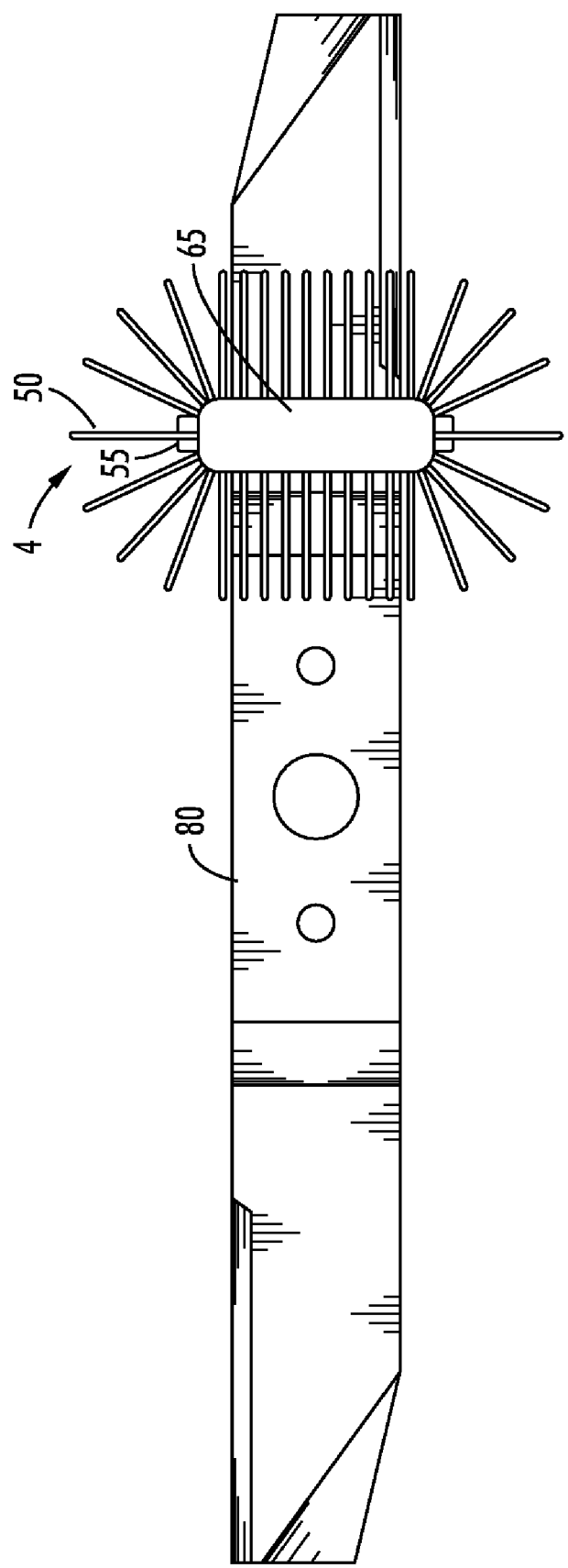
FIG. 7 is a top view of the second cleaning element of the present invention shown attached to a mowing blade.

In use, the cleaning brush 4, as shown attached to a mowing blade in FIG. 7, is inserted over the end of a mowing blade 80 and placed at a point along the length of the mowing blade where there is a change in the width of the mowing blade 80. This placement point may vary by mowing blade manufacturer, but will be a point at which the cleaning brush 4 is to be attached to the mowing blade 80 and will provide a secure resting point for the cleaning brush 4.

Figure 8:
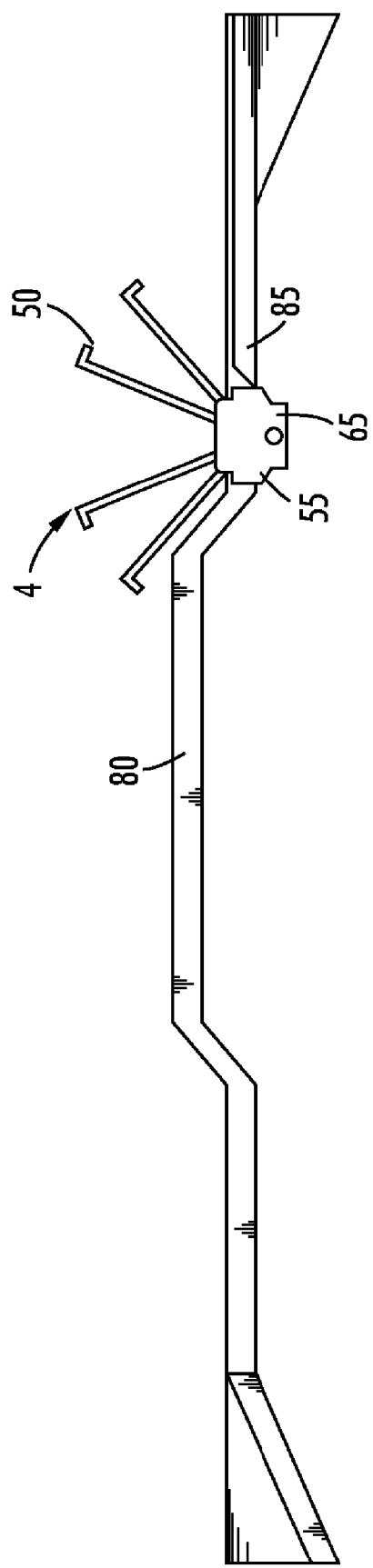
FIG. 8 is a side elevational view of the second cleaning element of the present invention shown attached to a mowing blade.

Another point at which the cleaning brush 4 may be terminated along the length of the mowing blade 80 is a point along the length of the blade where the elevation of the blade changes. This is indicated in FIG. 8 as location 85. One may place a cleaning brush 4 on either end of the mowing blade, or optionally use two or more cleaning brushes for each mowing blade.

Once the cleaning brush 4 is in a proper position along the length of the mowing blade 80, the bolt 70 shown in FIGS. 4 and 5 is tightened. The bolt 70 is tightened so that the metal body 65 constricts around the mowing blade, and provides mechanical attachment of the cleaning brush 4 to the mowing blade.

Once the cleaning brush 4 is securely attached to the mowing blade 80, the operator of the device will apply power to the mowing deck, allowing the blades to rotate the cleaning brush 4 around the underside of the mowing deck. The operator may elect to use apparatus 1 to deliver a high pressure spray to the underside of the mowing deck in conjunction with the mechanical cleaning action of the cleaning brush 4.

The operator of the device will operate the brushes, and observe from a safe position the ejection of cutting debris from the underside of the mowing deck. Once the operator notices that the quantity of debris being ejected from the underside of the mowing deck has significantly decreased or stopped, the operator can assume that the cleaning process is complete, and will turn OFF the power to the mowing deck and turn OFF the fluid supply to apparatus 1.

FIGS. 9, 10, 11, and 12 show various variations of a device to clean accumulated cutting debris from the topside of a mowing deck. The device uses the movement of air to clean and remove accumulated cutting debris from the top side of a mowing deck using fan blades 90. The fan blades 90 are made of a soft material such as rubber to absorb impact in the event that the fan blades 90 come into contact with another object. This improves the safety of the air cleaning device. The movement of air with the fan blades 90 also provides additional cooling to the motor of the cutting device.

Figure 9:
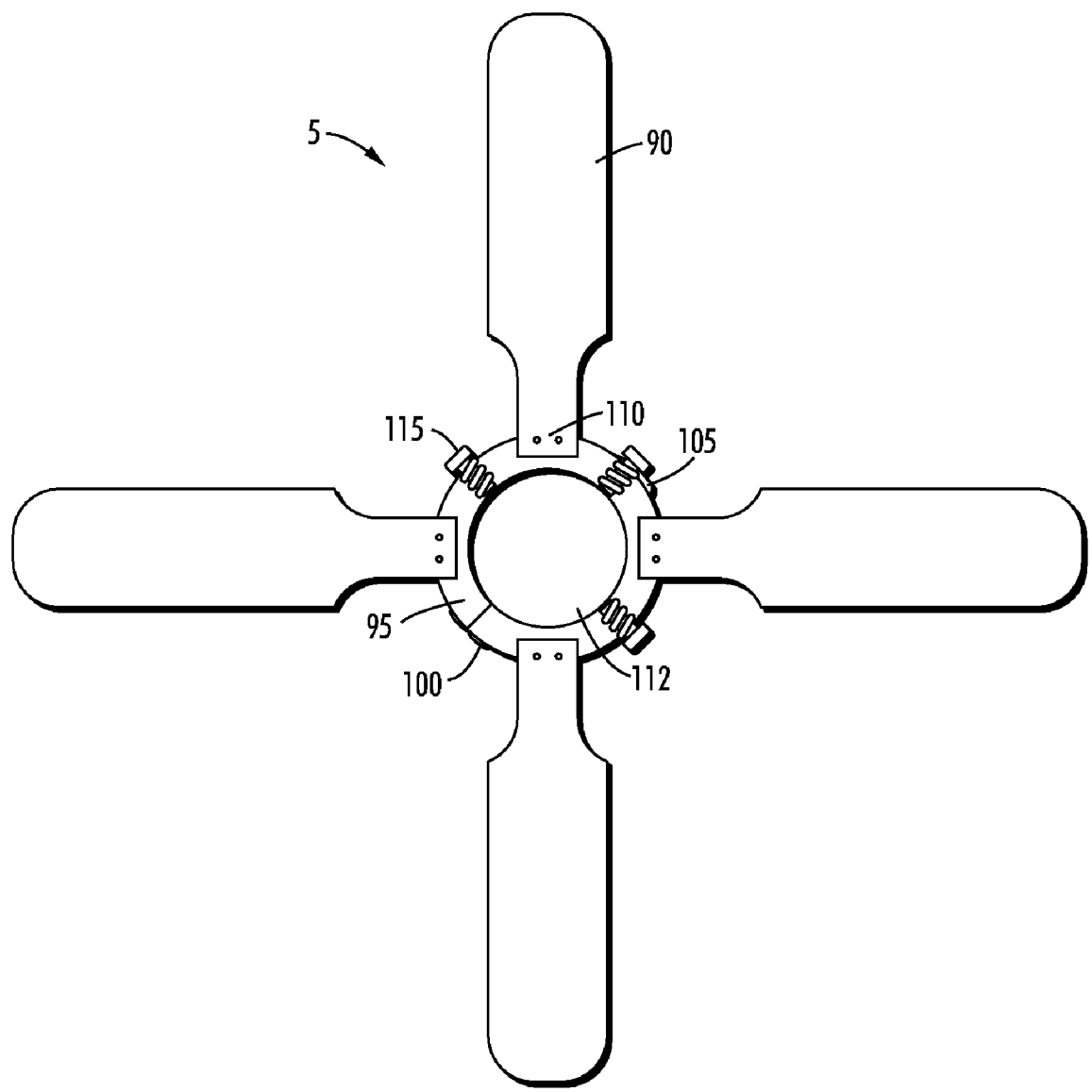
FIG. 9 is a top plan view of one embodiment of the third cleaning element of the present invention shown in the closed position.
Figure 10:
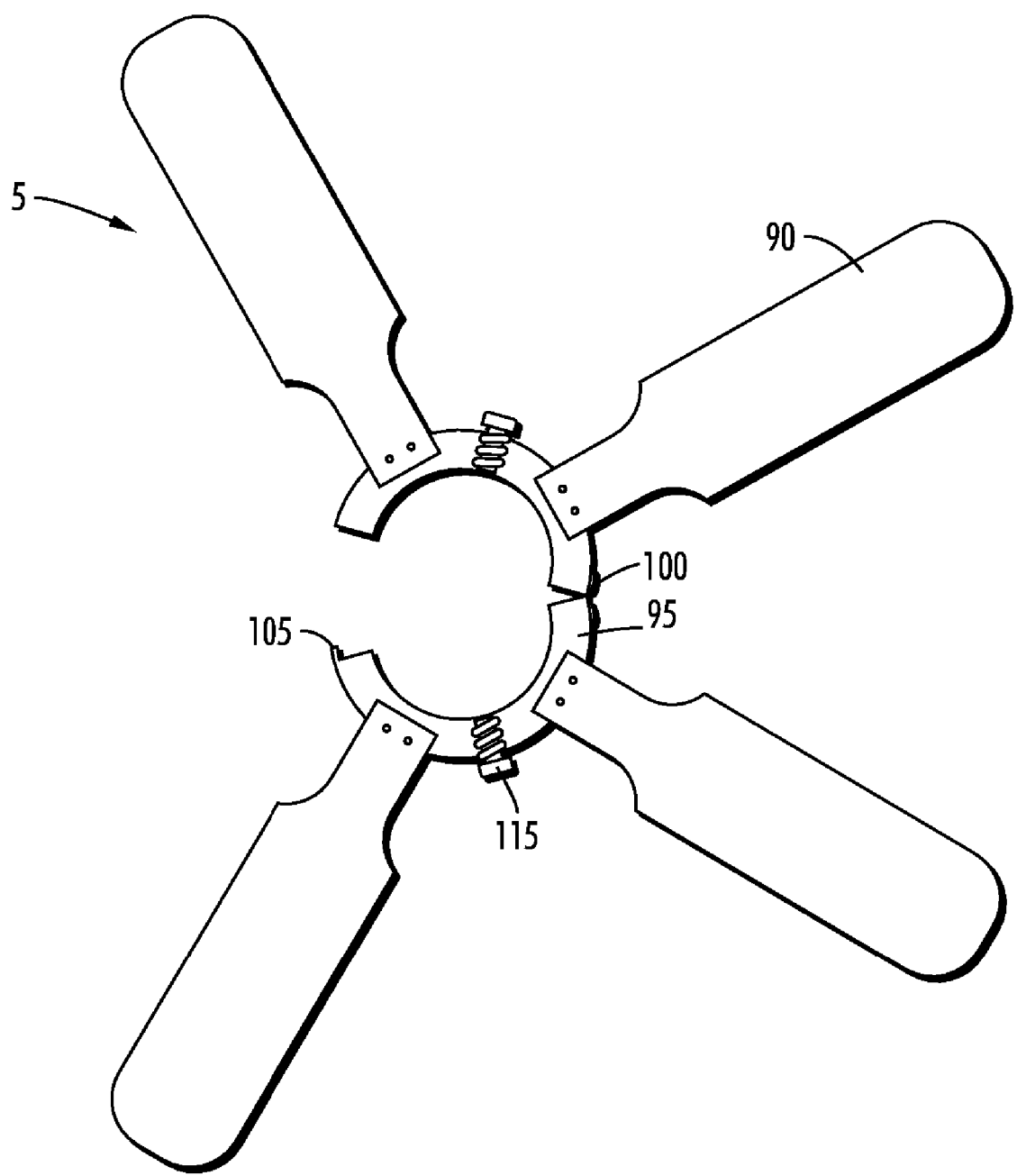
FIG. 10 is a top plan view of one embodiment of the third cleaning element of the present invention shown in the open position.

FIG. 9 shows the air cleaning device 5 with a hinged yoke to allow fastening to a drive shaft or spindle. FIG. 9 shows the hinged yoke in a closed position, and FIG. 10 shows the hinged yoke in an open position. The yoke 95 connects the fan blades 90 to a drive shaft, and is made of a metal such as hardened steel, stainless steel or titanium. The yoke 95 contains a hinge 100 that allows the yoke to open. The yoke 95 also contains a latch 105 that secures the yoke 95 in a closed position around the drive shaft or spindle.

The yoke 95 contains an opening 112 to accommodate a drive shaft or spindle. The diameter of the opening 112 may be slightly smaller than the drive shaft diameter, or the opening 112 may contain knurls or surface texture to ensure proper friction fit between the yoke 95 and the drive shaft or spindle. The yoke 95 also contains bolts 115 contained in threaded holes that traverse the diameter of the yoke 95 and make contact with the drive shaft or spindle upon which the yoke is attached.

The bolts 115 are tightened once the yoke 95 is closed and latched, and serve to apply pressure to the drive shaft or spindle and thus secure the air cleaning device 5 to the drive shaft or spindle. The bolts 115 are preferably made from hardened steel to withstand high bolt torque. The flexible fan blades 90 are attached to the yoke 95 with metal fasteners 110 such as bolts, rivets or screws. The metal fasteners 110 contain a head of sufficient size and shape as to prevent pulling through the fan blade material.

In using the hinged yoke version of the air cleaning device 5, one opens the yoke latch 105, and places the yoke of the air cleaning device 95 around an appropriate part of a drive shaft or spindle, clear of obstructions. The hinged yoke 95 is then closed around the drive shaft or spindle, the latch 105 is closed and locked, and all four perimeter bolts 115 are tightened. The perimeter bolts 115 may contain lock washers, nylon inserts, or an anti-loosening compound to prevent the perimeter bolts 115 from backing out of the hinged yoke 95.

Figure 11:
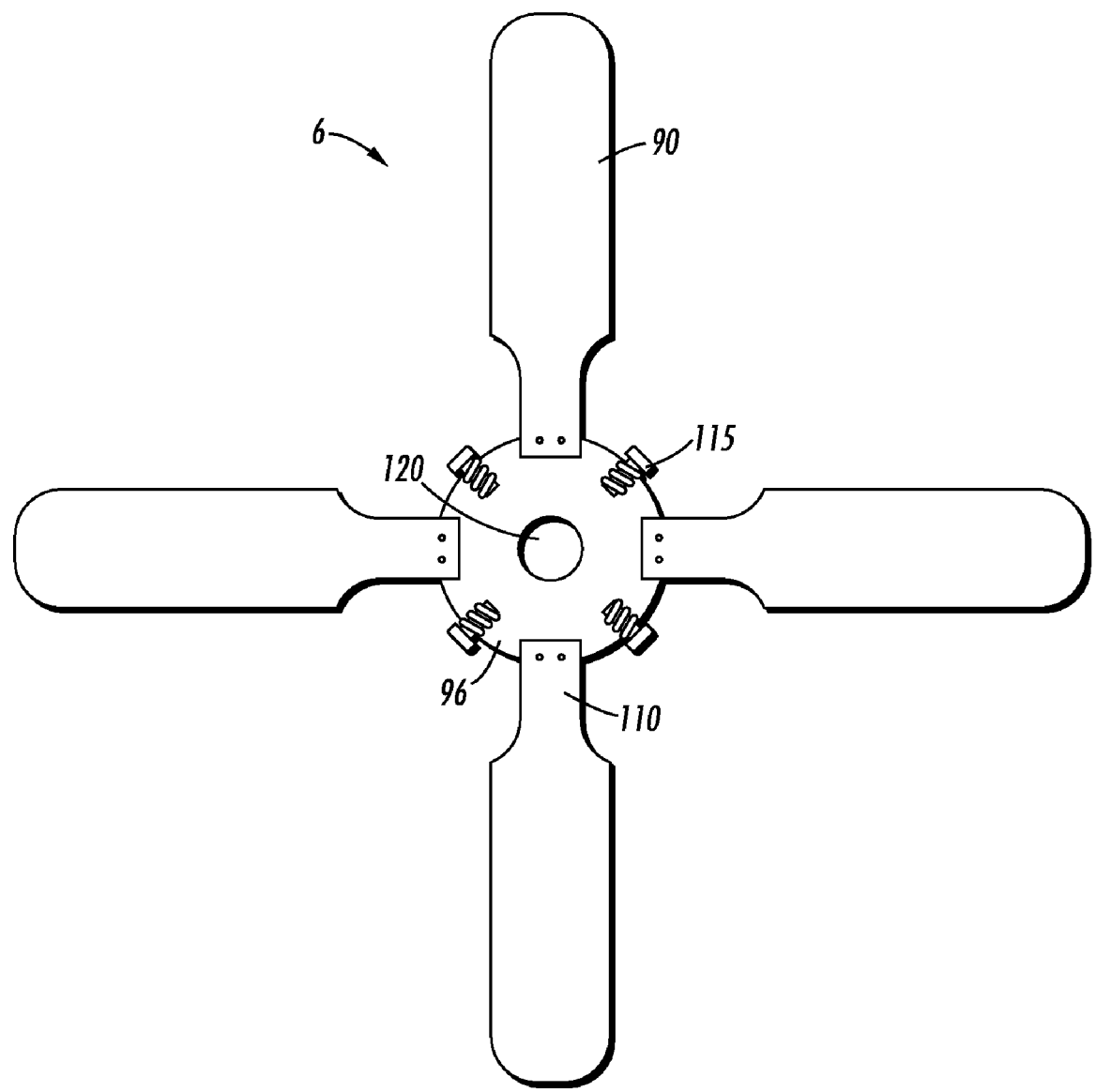
FIG. 11 is a top plan view of another embodiment of the third cleaning element of the present invention.

A modification to the air cleaning device 5 is shown in FIG. 11. This modified air cleaning device 6 contains a fixed yoke 96. The fixed yoke 96 of this device is for placement on an open end of a drive shaft that is free of obstructions such as pulleys, sprockets, or drive mechanisms. The yoke 96 connects the fan blades 90 to a drive shaft. In this embodiment, the drive shaft is round, and the opening 120 in the fixed yoke 96 is also round, and of the same diameter as the drive shaft. The opening 120 in the fixed yoke 96 is made to accommodate a drive shaft.

The fixed yoke 96 is made of a metal such as hardened steel, stainless steel, or titanium. The fixed yoke 96 also contains bolts 115 contained in threaded holes that traverse the diameter of the fixed yoke 96 and make contact with the drive shaft or spindle upon which the yoke is attached.

The bolts 115 are tightened once the fixed yoke 96 is in place along the drive shaft or spindle, and serve to apply pressure to the drive shaft or spindle and thus secure the modified air cleaning device 6 to the drive shaft or spindle. The bolts 115 are preferably made from hardened steel to withstand high bolt torque. The flexible fan blades 90 are attached to the fixed yoke 96 with metal fasteners 110 such as bolts, rivets or screws. The metal fasteners 110 contain a head of sufficient size and shape as to prevent pulling through the fan blade material.

In using the fixed yoke version of the modified air cleaning device 6, one places the fixed yoke 96 of the modified air cleaning device 6 around an appropriate end of a drive shaft or spindle, clear of obstructions. The fixed yoke 96 is slid to an appropriate point along the drive shaft or spindle, and all perimeter bolts 115 are tightened. The perimeter bolts 115 may contain lock washers, nylon inserts, or an anti-loosening compound to prevent the perimeter bolts 115 from backing out of the fixed yoke 96.

Figure 12:
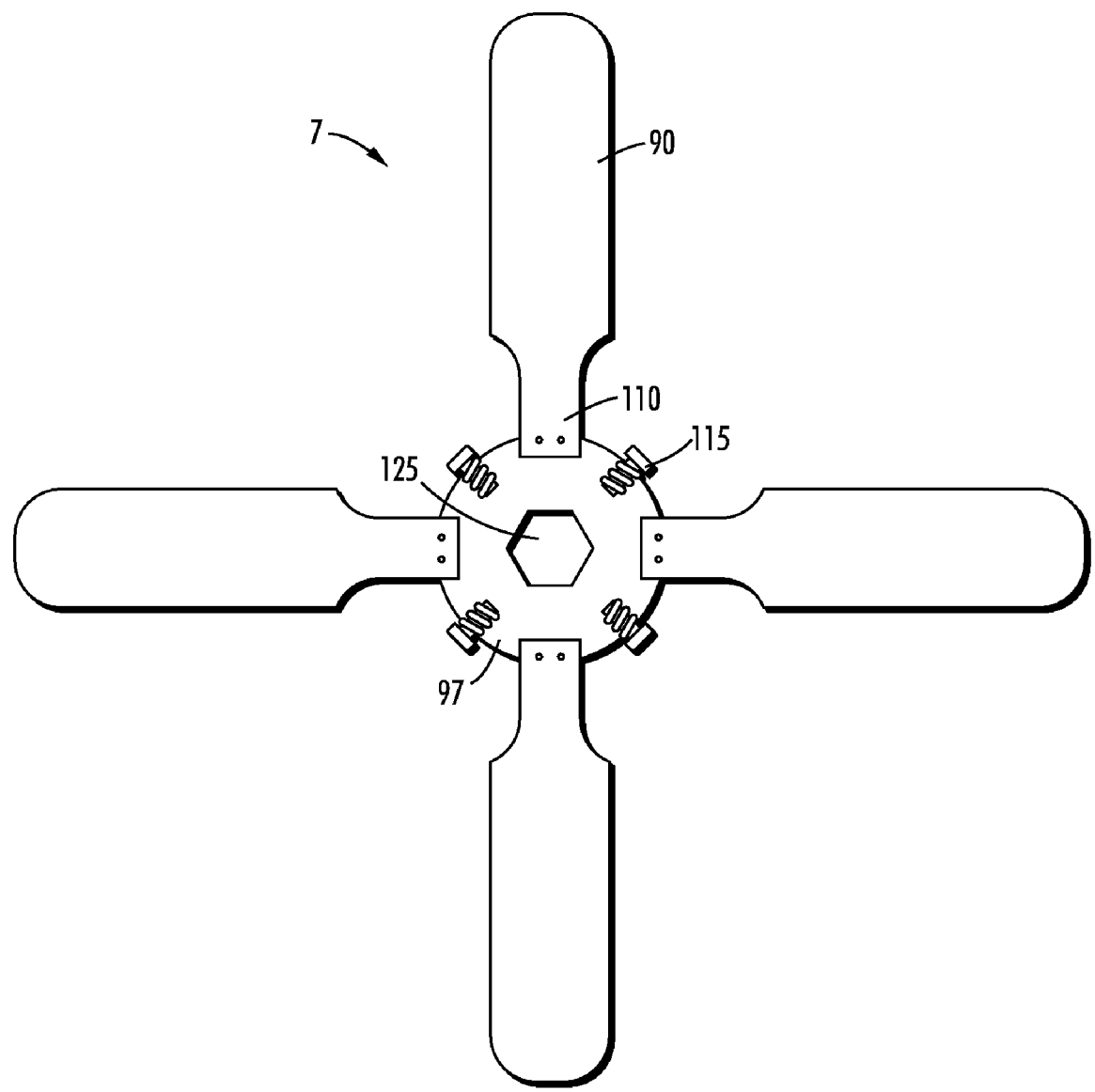
FIG. 12 is a top plan view of yet another embodiment of the third cleaning element of the present invention.

A further modification to the air cleaning device 5 is shown in FIG. 12. This modified air cleaning device 7 contains a fixed yoke 97. The fixed yoke 97 of this device is for placement on an open end of a drive shaft that is free of obstructions such as pulleys, sprockets, or drive mechanisms. In this embodiment, the drive shaft is hexagonal, and the opening 125 in the fixed yoke 97 is also hexagonal, and of the same size as the drive shaft. The opening 125 in the fixed yoke 97 is made to accommodate a drive shaft or spindle.

The fixed yoke 97 is made of a metal such as hardened steel, stainless steel, or titanium. The fixed yoke 97 also contains four bolts 115 contained in threaded holes that traverse the diameter of the fixed yoke 97 and make contact with the drive shaft or spindle upon which the yoke is attached. The bolts 115 are tightened once the fixed yoke 97 is in place along the drive shaft or spindle, and serve to apply pressure to the drive shaft or spindle and thus secure the modified air cleaning device 7 to the drive shaft or spindle.

The bolts 115 are preferably made from hardened steel to withstand high bolt torque. The flexible fan blades 90 are attached to the fixed yoke 97 with metal fasteners 110 such as bolts, rivets or screws. The metal fasteners 110 contain a head of sufficient size and shape as to prevent pulling through the fan blade material.

In using the fixed yoke version of the modified air cleaning device 7, one places the fixed yoke 97 of the modified air cleaning device 7 around an appropriate end of a drive shaft or spindle, clear of obstructions. The fixed yoke 97 is slid to an appropriate point along the drive shaft or spindle, and all perimeter bolts 115 are tightened. The perimeter bolts 115 may contain lock washers, nylon inserts, or an anti-loosening compound to prevent the perimeter bolts 115 from backing out of the fixed yoke 96.

Figure 13:
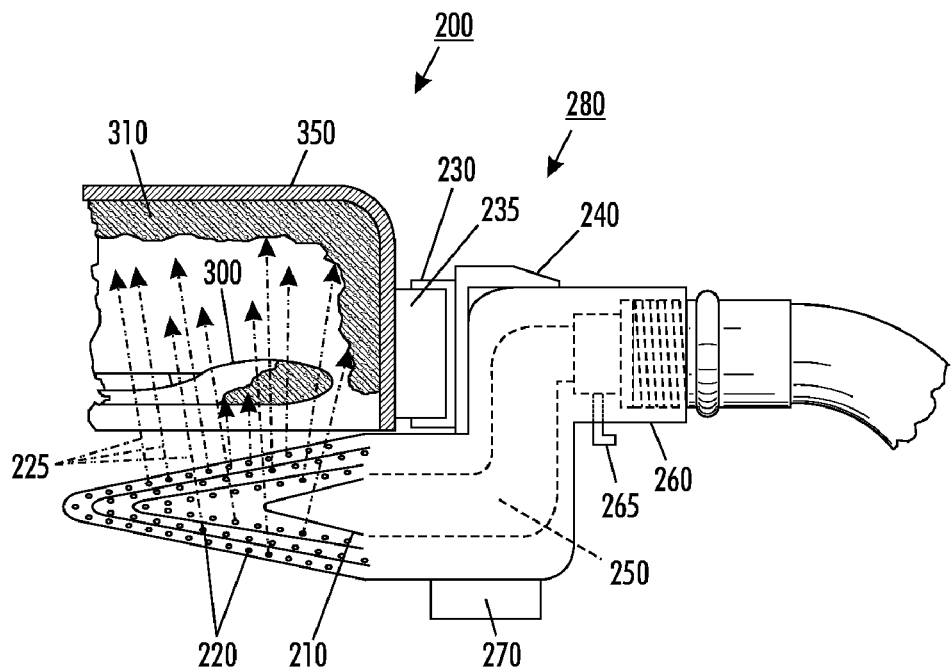
FIG. 13 is a side view of another embodiment of a fluid cleaning device according to the concepts of the present invention.

A cleaning apparatus 200 is further illustrated in FIG. 13 for cleaning the underside of mowing deck 350 of a garden tractor, riding lawn mower, walk behind lawn mower, or other landscaping equipment. Conduit 250, of apparatus 200, is generally a hollow member to allow the flow of fluid from connector 260 through conduit 250 and into plenum 210 to be dispersed onto the underside of mower deck 350 by way of apertures 220. Apertures 220 allow for the deliverance of fluid when conduit 250 is connected to a source of fluid, such as water. The dimensions of apertures 220 are relatively small to allow for a high velocity stream to be directed at the grass debris. The trajectory angle of apertures 220 may be determined by their placement along the upper surface area of injector plenum 210. The apertures 220 may direct the jets of the fluid at diverse angles. Moreover, each aperture 220 may be at a diverse angle with respect to a surface of the plenum 210. On the other hand, the surface of the plenum may be irregular and each aperture 220 is normal to a surface of the plenum 210. Also, the apertures 220 may have non-circular perimeters.

A total cross-sectional area of the plurality of apertures 220 may be less than a cross-sectional area of the inlet of the conduit 250. Also, a cross-sectional area of the outlet of the conduit 250 may be less than a cross-sectional area of the inlet of the conduit 250.

In the alternative, apertures 220 may have an opening described by a geometric shape that protrudes obliquely or upright from the surface plane of the plenum thereby forming a nozzle. The inherent function of aperture 220, or an associated convergence nozzle formed within aperture 220, is to convert pressure energy (PSI), supplied by the source, into kinetic energy (ft/lbs) in the form of a high velocity, low volume water jet stream.

As further viewed in FIG. 13 conduit 250 of cleaning apparatus 200 is attached to the mowing deck 350 using magnet 235. The magnet 235 is located within magnet housing 230, connected to the conduit 250 via support rib or gusset 240. The conduit 250 may be, optionally, further supported vertically with stabilizer(s) 270.

Fluid connector 260 provides conduit 250 with a connection to a fluid source. Conduit 250 enables the fluid to be conveyed into plenum 210 to be subsequently dispensed into mover deck 350. A plurality of jet streams 225 are strategically directed at debris 310 by way of a plurality of associated apertures 220. Furthermore, an optional venturi port 265 enables the siphoning of a secondary fluid, such as a detergent, disinfectant, solvent, or lubricant, into the mainstream to generate a chemical solution. The ratio of primary to secondary fluids is a function of the diameter of port 265, as well as, the velocity of the primary fluid passing through conduit 250.

Magnet 235 is preferably a permanent type magnet consisting of either rare earth materials, such as Neodymium or Samarium or more traditional materials such as Ceramic or Alnico and the like. Accordingly, magnet 235 readily provides an effective passive, as well as non-invasive, technique for attaching the deck cleaning assembly 200 since it does not require the aforementioned physical fastening devices such as rivets, screws, bolts, glue, and the like. Moreover, the magnet 235 provides a mechanism for mounting the cleaning device to the mower deck without having a portion of the cleaning device engage the inside wall of the mower deck, thereby avoiding accidental contact between a moving mower blade and the cleaning device attachment mechanism.

Additionally, in the case where it is advantageous to control the magnetic forces, magnet 235 may be an electromagnet that can be energized with the on-board battery of the mower.

Figure 14:
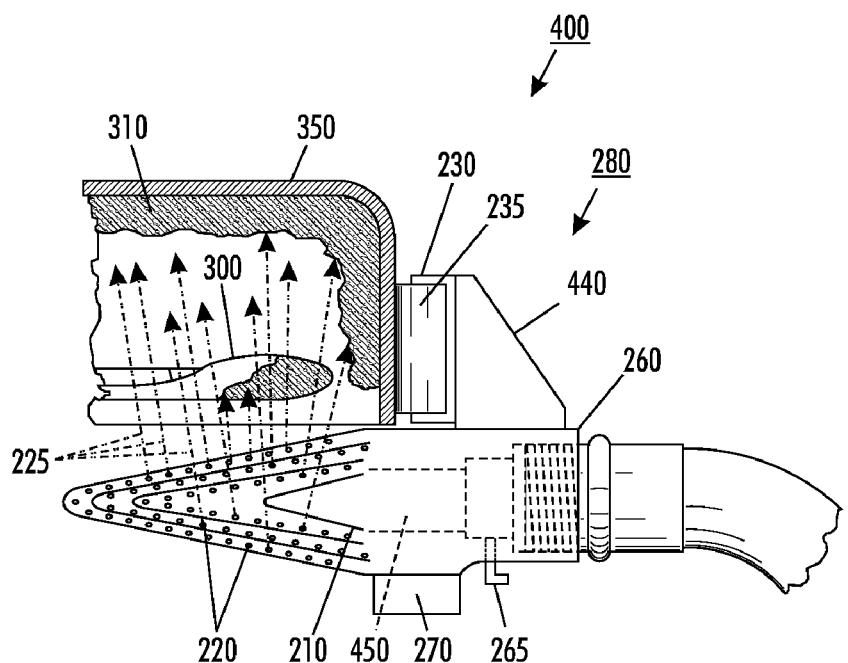
FIG. 14 is a side view of another embodiment of a fluid cleaning device according to the concepts of the present invention.

Therefore, according to the concepts of the present invention, as viewed in FIGS. 13 and 14, while cleaning assembly 200 has been securely mounted using magnetic forces, it is yet positionable in both the horizontal and vertical plane so as to accommodate the optimal placement of deck cleaning assembly 200 underneath mowing deck 350, absent any mechanical mounting hardware or tools. Additionally, optional stabilizer(s) 270 may provide a load bearing contact with the ground for inline conduit 250 to assist magnet 235 in holding cleaning assembly 200 or 400 to deck 350.

As illustrated in FIG. 14, a side view of an alternate embodiment whereby inline conduit 450 is utilized to deliver fluid to plenum 210. Conduit 450 of cleaning apparatus 400 is attached to the mowing deck 350 using magnet 235. The magnet 235 is located within magnet housing 230, connected to the conduit 450 via support rib or gusset 440. The conduit 450 may be, optionally, further supported vertically with stabilizer(s) 270.

Fluid connector 260 provides conduit 450 with a connection to a fluid source. Conduit 450 enables the fluid to be conveyed into plenum 210 in a straight line to be subsequently directly dispensed into mower deck 350. A plurality of jet streams 225 are strategically directed at debris 310 by way of a plurality of associated apertures 220. Inline cleaning apparatus 400 also includes fluid connector 260 that may be a threaded garden hose fitting, a quick release hose fitting, or a push in to connect, such as used with power washers and compressed air hoses. A secondary fluid connection is provided at venturi port 265 which affords a means to siphon a fluid, such as a detergent, disinfectant, solvent or lubricant, into the mainstream to provide a chemical solution. The ratio of main fluid to siphoned fluids is determined by the diameter of port 265, as well as, the velocity of the primary fluid passing through conduit 450.

Figure 15:
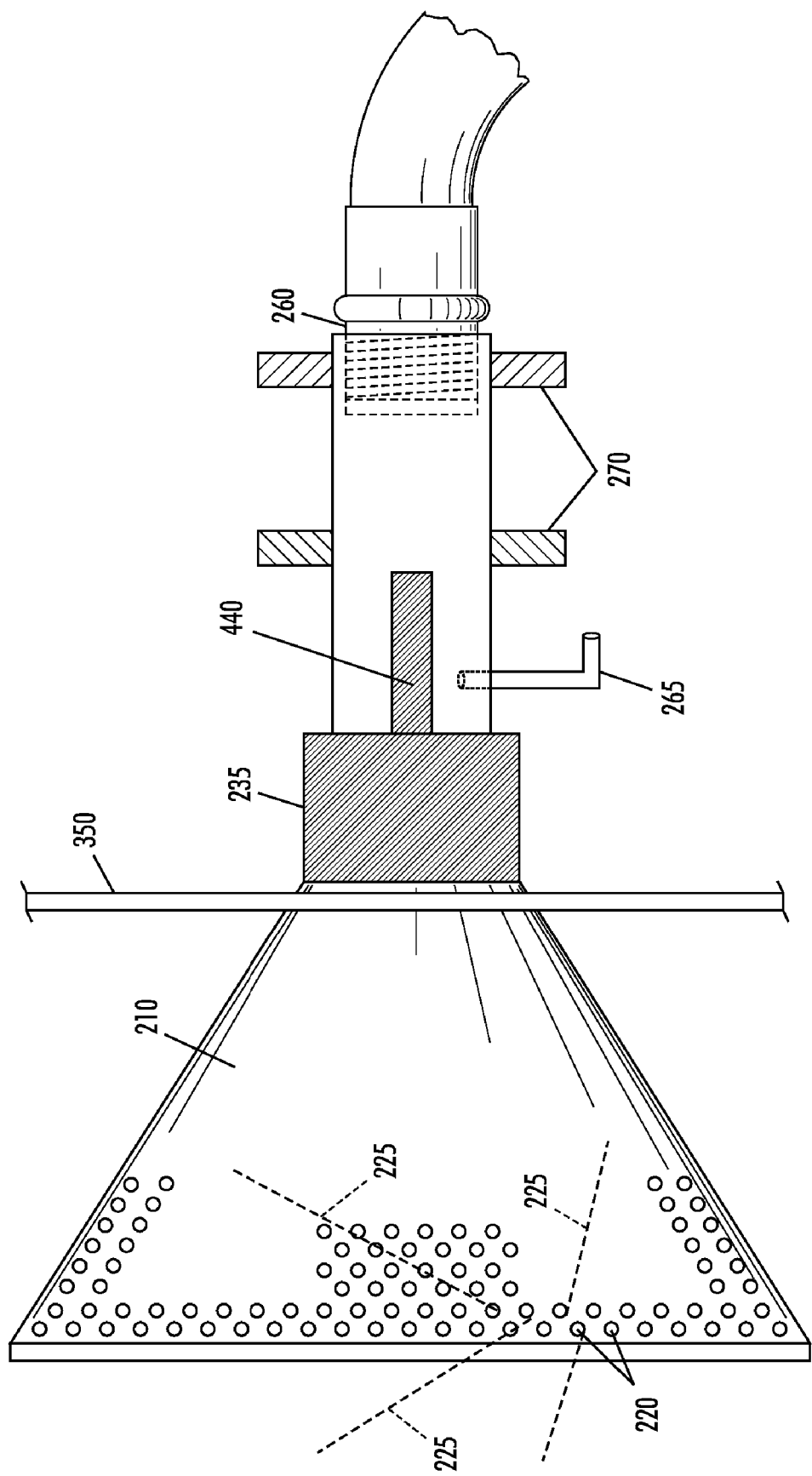
FIG. 15 is a top view of the embodiments of FIGS. 13 and 14 according to the concepts of the present invention.
Figure 16:
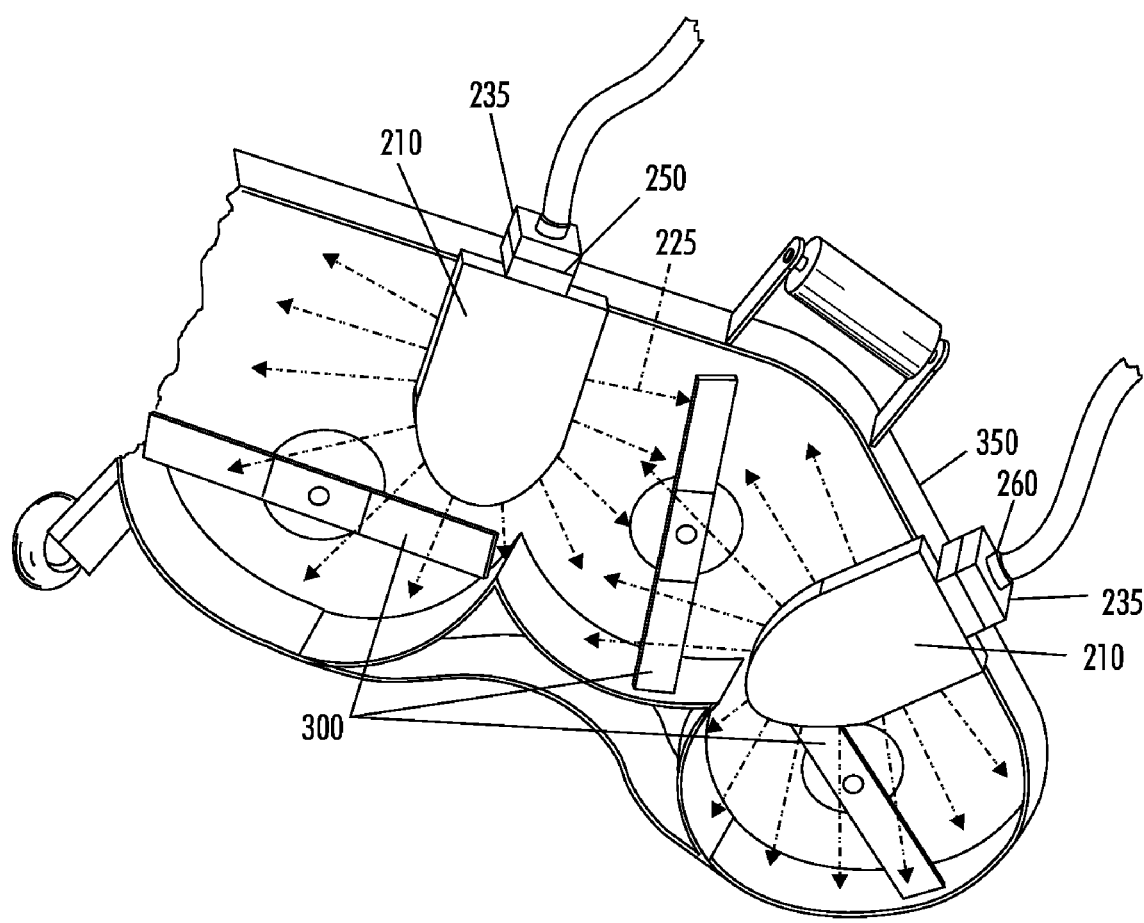
FIG. 16 is a underneath looking up view of the embodiments of FIGS. 13 and 14 according to the concepts of the present invention.

FIG. 15 shows, in more detail, a top view of the arrangement of apertures 220 within plenum 210 and the various upward trajectories of jet streams 225. The streams 225 are directed so as to erode any accumulation of grass clippings that failed to discharge from the deck during mowing. It is noted that the routine practice of maintaining a clean mover serves to curtail the cross-contamination of undesirable vegetation from lawn to lawn, as well as, the spread of insects and plant diseases. Accordingly, FIG. 16 illustrates a underside view of conduit 250 connected to plenum 210 with the strategic positioning of jet streams 225 relative to deck 350.

Figure 17:
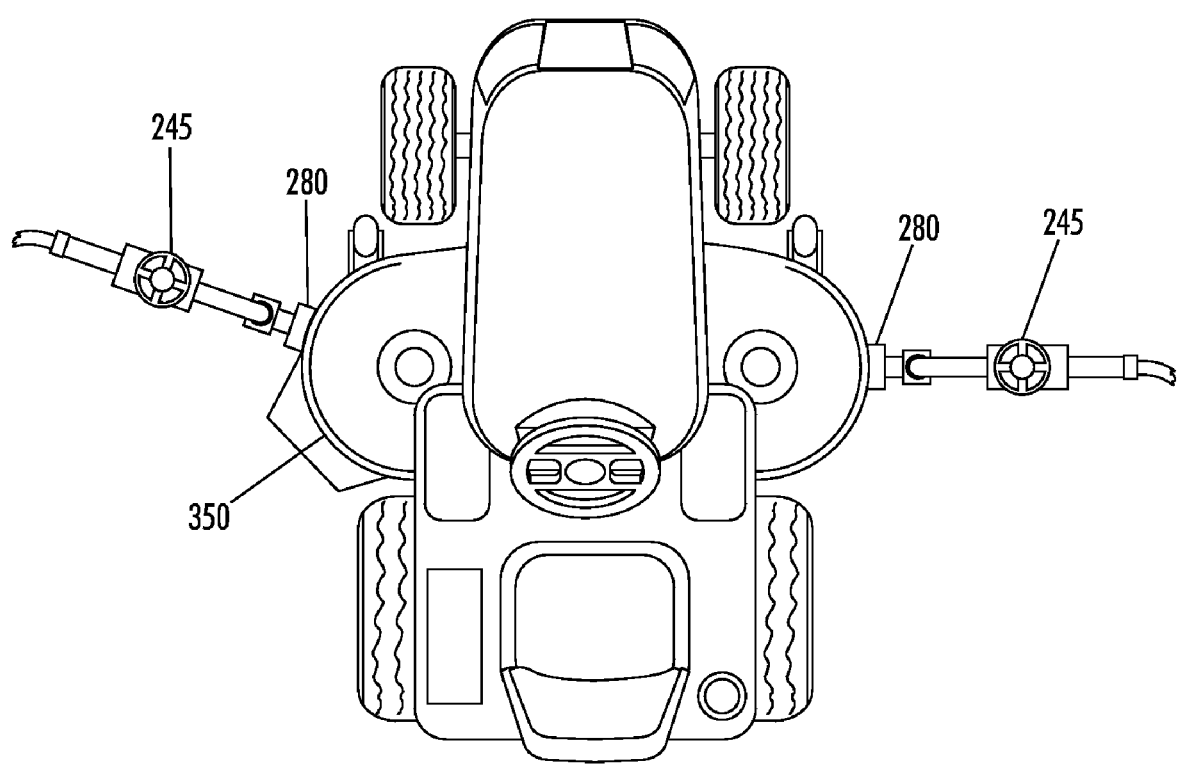
FIG. 17 is an aerial view of a multi-blade mower having a right and left side cleaning attachment.
Figure 18:
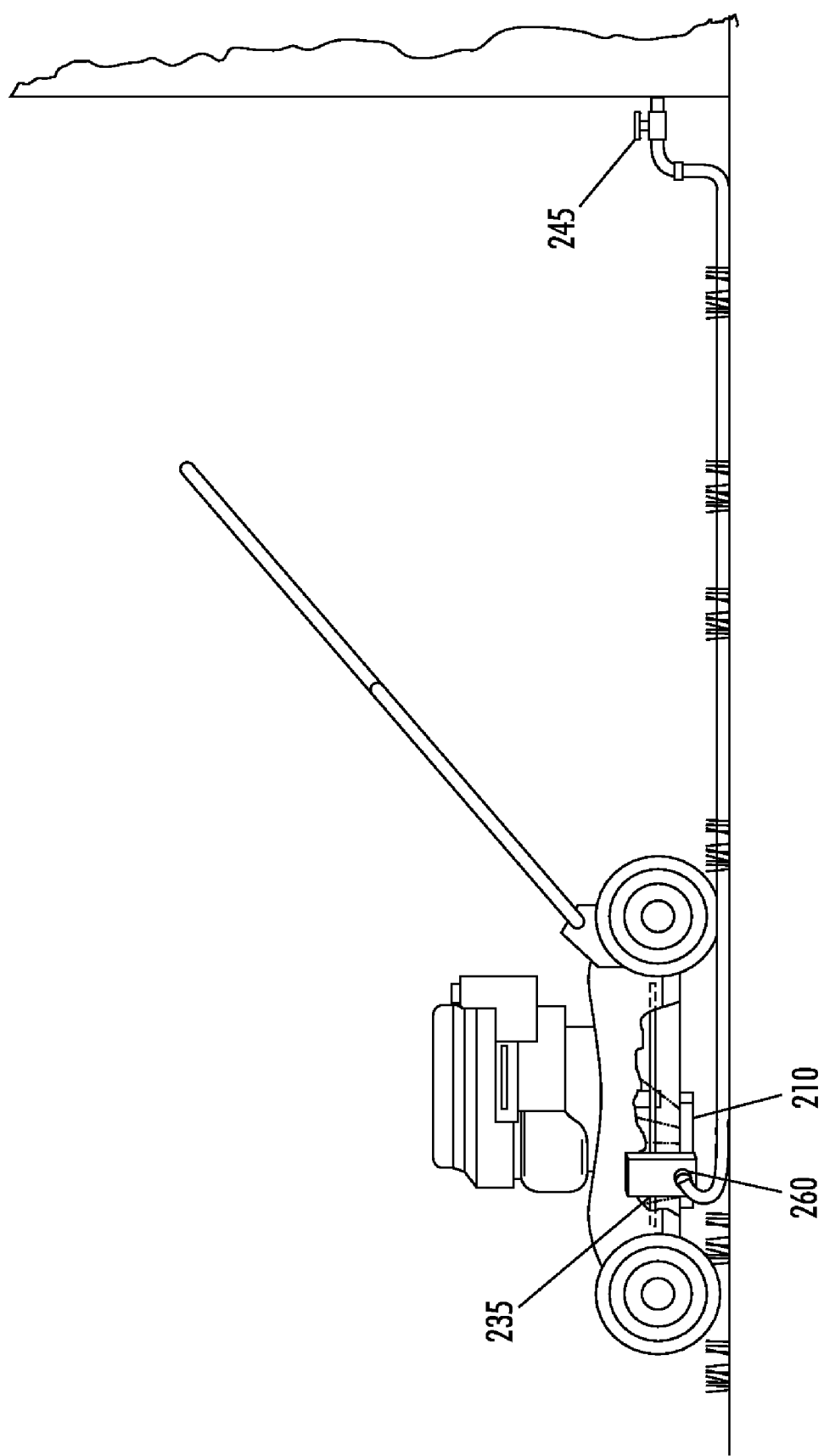
FIG. 18 is a side view of a single blade mower showing the magnetically attached plenum.

Deck cleaning assembly 200 as seen in FIG. 17 is applied to either side or both of a multi-blade mower deck, by either employing two cleaning assemblies 200 in tandem connected to a Y-hose adapter or in the alternative moving assembly 200 from one location to the other. On the other hand, as depicted in FIG. 18 a single bladed mower may only require mounting from one side. Additionally, in either application, it is not essential to have blade assembly 300 engaged and rotating during a cleaning operation, however this is an optional alternative, pending the degree of cleaning required.

In summary, a cleaning device for injecting a fluid to an underside of a mowing deck includes a hollow member including an inlet for receiving fluid from a source and an outlet; a plenum chamber appended to the outlet of the hollow member; a plurality of apertures situated in the plenum for directing jets of the fluid to the underside of the mowing deck; and a magnetic mounting assembly to secure the hollow member to a side wall of the mowing deck.

The apertures may direct the jets of the fluid at diverse angles. Moreover, each aperture may be at diverse angles with respect to a surface of the plenum or normal to a surface of the plenum. The apertures may have non-circular perimeters.

A total cross-sectional area of the plurality of apertures may be less than a cross-sectional area of the inlet of the hollow member. Also, a cross-sectional area of the outlet of the hollow member may be less than a cross-sectional area of the inlet of the hollow member.

The magnetic mounting assembly may include an electromagnet or a permanent magnet.

The cleaning device may also include a stabilizer to provide additional vertical support for the hollow passage and/or a venturi port in the hollow member for siphoning another fluid into the fluid.

Furthermore, a cleaning device for injecting a fluid to an underside of a mowing deck includes a hollow member including an inlet for receiving fluid from a source and an outlet; an aperture located in proximity of the outlet of the hollow member for directing a jet of the fluid to the underside of the mowing deck; and a magnetic mounting assembly to secure the hollow member to the mowing deck.

The magnetic mounting assembly may include an electromagnet or a permanent magnet.

The cleaning device may include a stabilizer to provide additional vertical support for the hollow passage and/or a venturi port in the hollow member for siphoning another fluid into the fluid.

Also, a cleaning device for injecting a fluid to an underside of a mowing deck includes a hollow member including an inlet for receiving fluid from a source and an outlet; a plenum chamber appended to the outlet of the hollow member, the plenum extending away from a sidewall of a mowing deck and in parallel to a blade assembly located in the mowing deck; a plurality of apertures situated in the plenum for directing jets of the fluid to the underside of the mowing deck; and a mounting assembly to secure the hollow member to the mowing deck.

The apertures may direct the jets of the fluid at diverse angles. The apertures may have non-circular perimeters.

A total cross-sectional area of the plurality of apertures may be less than a cross-sectional area of the inlet of the hollow member. The mounting assembly may include a permanent magnet.

The cleaning device may include a stabilizer to provide additional vertical support for the hollow passage and/or a venturi port in the hollow member for siphoning another fluid into the fluid.

While various examples and embodiments of the present invention have been shown and described, it will be appreciated by those skilled in the art that the spirit and scope of the present invention are not limited to the specific description and drawings herein, but extend to various modifications and changes.

What is claimed is:

1. A cleaning device for injecting a fluid to an underside of a mowing deck, comprising:
   a hollow member including a first end for receiving fluid from a source and a second end to output the received fluid;
   a plenum appended to the second end of the hollow member, said plenum receiving fluid from said hollow member, said plenum having a top side, said top side of said plenum facing the underside of the mower deck;

a plurality of apertures situated on said top side of said plenum for directing jets of the fluid received in said plenum to the underside of the mowing deck; and a magnetic mounting assembly, operatively connected to said hollow member, to secure said hollow member to the side wall of the mowing deck so as to position said top side of said plenum below the side wall of the mowing deck when said magnetic mounting assembly secures said hollow member to the side wall of the mowing deck.

2. The cleaning device as claimed in claim 1, wherein said plurality of apertures include non-orthogonal apertures with respect to a surface of said plenum and orthogonal apertures with respect to a surface of said plenum.

3. The cleaning device as claimed in claim 1, wherein each aperture is non-orthogonal with respect to a surface of said plenum.

4. The cleaning device as claimed in claim 1, wherein each aperture is normal to a surface of said plenum.

5. The cleaning device as claimed in claim 1, wherein a total cross-sectional area of said plurality of apertures is less than a cross-sectional area of said first end of said hollow member.

6. The cleaning device as claimed in claim 1, wherein a cross-sectional area of said second end of said hollow member is less than a cross-sectional area of said first end of said hollow member.

7. The cleaning device as claimed in claim 1, wherein said magnetic mounting assembly includes an electromagnet.

8. The cleaning device as claimed in claim 1, wherein said magnetic mounting assembly includes a permanent magnet.

9. The cleaning device as claimed in claim 1, further comprising a stabilizer to provide additional vertical support for said hollow member.

10. The cleaning device as claimed in claim 1, wherein said apertures have non-circular perimeters.

11. The cleaning device as claimed in claim 1, further comprising a venturi port in said hollow member for siphoning another fluid into the fluid.

12. A cleaning device for injecting a fluid to an underside of a mowing deck, comprising:

a hollow member including a first end for receiving fluid from a source and a second end to output the received fluid;

an aperture located in proximity of said second end of said hollow member for directing a jet of the fluid received in said hollow member to the underside of the mowing deck; and a magnetic mounting assembly, operatively connected to said hollow member, to secure said hollow member to the side wall of the mowing deck so as to position said aperture below the side wall of the mowing deck when said magnetic mounting assembly secures said hollow member to the side wall of the mowing deck.

13. The cleaning device as claimed in claim 12, wherein said magnetic mounting assembly includes an electromagnet.

14. The cleaning device as claimed in claim 12, wherein said magnetic mounting assembly includes a permanent magnet.

15. The cleaning device as claimed in claim 12, further comprising a stabilizer to provide additional vertical support for said hollow member.

16. The cleaning device as claimed in claim 12, further comprising a venturi port in said hollow member for siphoning another fluid into the fluid.

17. A cleaning device for injecting a fluid to an underside of a mowing deck, comprising:

a hollow member including a first end for receiving fluid from a source and a second end to output the received fluid;

a plenum appended to the second end of the hollow member, said plenum extending away from a sidewall of a mowing deck and in parallel to a blade assembly located in the mowing deck, said plenum receiving fluid from said hollow member, said plenum having a top side, said top side of said plenum facing the underside of the mower deck;

a plurality of apertures situated on said top side of said plenum for directing jets of the fluid received in said plenum to the underside of the mowing deck; and a magnetic mounting assembly, operatively connected to said hollow member, to secure said hollow member to the side wall of the mowing deck so as to position said top side of said plenum below the side wall of the mowing deck when said magnetic mounting assembly secures said hollow member to the side wall of the mowing deck.

18. The cleaning device as claimed in claim 17, wherein said plurality of apertures include non-orthogonal apertures with respect to a surface of said plenum and orthogonal apertures with respect to a surface of said plenum.

19. The cleaning device as claimed in claim 17, wherein a total cross-sectional area of said plurality of apertures is less than a cross-sectional area of said first end of said hollow member.

20. The cleaning device as claimed in claim 17, wherein said magnetic mounting assembly includes a permanent magnet.

* * * * *